United States Patent [19]
Bilz et al.

[11] Patent Number: 5,674,031
[45] Date of Patent: Oct. 7, 1997

[54] TOOL HOLDER IN PARTICULAR QUICK EXCHANGE CHUCK

[75] Inventors: Reiner Bilz, Esslingen; Siegfried Bader, Koengen, both of Germany

[73] Assignee: Otto Bilz Werkzeugfabrik GmbH & Co., Ostfidern, Germany

[21] Appl. No.: 576,078

[22] Filed: Dec. 21, 1995

[30] Foreign Application Priority Data

Dec. 21, 1994 [DE] Germany ............... 44 45 611.5
Nov. 2, 1995 [EP] European Pat. Off. ............. 95117209

[51] Int. Cl.$^6$ ............... B23B 47/24; B23B 51/06
[52] U.S. Cl. ............... 408/6; 279/20; 279/126; 279/75; 279/905; 408/8; 408/11; 408/57
[58] Field of Search ............... 408/6, 9, 11, 16, 408/56, 57, 59, 141, 8; 279/20, 126, 75, 905

[56] References Cited

U.S. PATENT DOCUMENTS

| 4,090,802 | 5/1978 | Bilz ............................... 408/6 |
| 4,425,060 | 1/1984 | Bilz et al. ...................... 408/6 |
| 5,248,229 | 9/1993 | Bilz ............................... 408/6 |
| 5,458,445 | 10/1995 | Bader et al. ..................... 408/57 |

FOREIGN PATENT DOCUMENTS

| 0292651 | 11/1988 | European Pat. Off. . |
| 0464335 | 1/1992 | European Pat. Off. . |
| 3902559 | 2/1990 | Germany . |
| 4314235 | 11/1994 | Germany . |

*Primary Examiner*—Steven C. Bishop
*Attorney, Agent, or Firm*—Michael J. Striker

[57] ABSTRACT

A tool holder comprises a receptacle having one end connectable with a machine spindle, to a receptacle and the like and an opposite end, a head provided on the opposite end and having a coaxial cylindrical head opening, a housing received non-rotatably and axially longitudinally displaceable in the head opening and having a coaxial cylindrical housing opening, a quick exchange insert for a tool insertable in the housing opening and coupleable with the housing, and an inner signal device reacting to a relative movement between the head and the inserted quick exchange insert to produce a disturbance signal which identifies a damaged or a destroyed tool.

45 Claims, 4 Drawing Sheets

TOOL HOLDER IN PARTICULAR QUICK EXCHANGE CHUCK

BACKGROUND OF THE INVENTION

The present invention relates to a tool holder, in particular a quick exchange chuck.

Tool holders are known in the art. One of such tool holders is disclosed, for example in U.S. patent application Ser. No. 08/230,754 of Apr. 21, 1994 now U.S. Pat. No. 5,458,445. This tool holder is provided with an axial length compensating device and therefore an axial length compensation during a relative displacement between the head and the housing in which the quick exchange insert inserted is possible. Such length compensation, for example to pressure has the advantage that when the tool is damaged or completely destroyed, and fixed for example in the workpiece, the axial advancement and the rotary drive is effected by the machine. It is desired to determine such a disturbance and to provide a signal to a suitable device in order to change the tool before the next working step. In connection with this U.S. Pat. No. 4,425,060 discloses a chuck which is provided with an integrated high frequency transmission device, which has proven efficient. However, it is expensive and requires an internal current source which must be exchanged after derating. Exchangeable current sources pause certain disposure problems.

SUMMARY OF THE INVENTION

Accordingly, it is an object of the present invention to provide a tool holder, in particular a quick exchange chuck, which avoids the disadvantages of the prior art.

In keeping with these objects and with others which will become apparent hereinafter, one feature of the present invention resides, briefly stated, in a tool holder which has one end receivable in a machine spindle and an opposite end carrying a head as well as a quick exchange insert, wherein in accordance with the present invention an inner signal device reacts to a relative movement between the head and the quick exchange insert so as to produce a disturbance signal, in particular when the tool is damaged or destroyed.

When a tool holder is designed in accordance with the present invention, a signal is produced when the tool is damaged, and the tool holder is compact, inexpensive and operates without an integrated high frequency transmitting device or an integrated current source.

The signal device is such that it does not change the dimensions and the structural expenses of the tool holder. The signal device is simple and operationally reliable.

It is especially advantageous when the inner signal device reacts to an axial displacement of the head relative to and in direction toward the housing, or in opposite direction. Such a construction is efficient when the tool holder has an axial length compensating device. Instead of this the inner signal device can react to a relative rotation between a part of the tool holder, for example a part of the housing, on the one hand, and the quick exchange insert or a part of the quick exchange insert on the other hand.

With the present invention, in an especially simple manner, a signal for a damaged or destroyed tool or a similar disturbance in the region between the tool and the workpiece can be represented by blocking a cooling medium flow, which leads to an increase of the ramp pressure in the conduit which supplies the cooling medium to the tool holder. This increased ramp pressure can be determined in a simple manner and a signal can be produced for the occurring disturbance. Therefore, during monitoring of the power tool and the processing operation, it can be easily and reliably determined during monitoring of the power tool and the processing operation, so that the safety device in the tool holder is activated and a defect is recognized. In the case when the tool is damaged, it can be stopped at the workpiece. The feed and the rotary drive of the machine however continue. In this case the safety coupling or for example a quick exchange insert is activated and the separation of the drive in the rotary direction is possible. Therefore an axial relative movement of the head relative to and in direction toward the housing can be performed, since the feed is further activated in the machine. The axial relative displacement or the relative rotation lead to blocking of the cooling medium flow, which leads to the disturbance signal as explained hereinabove.

Analogously, when an opposite-direction axial relative displacement of the head relative to the housing is performed, an axial length compensation with pulling is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
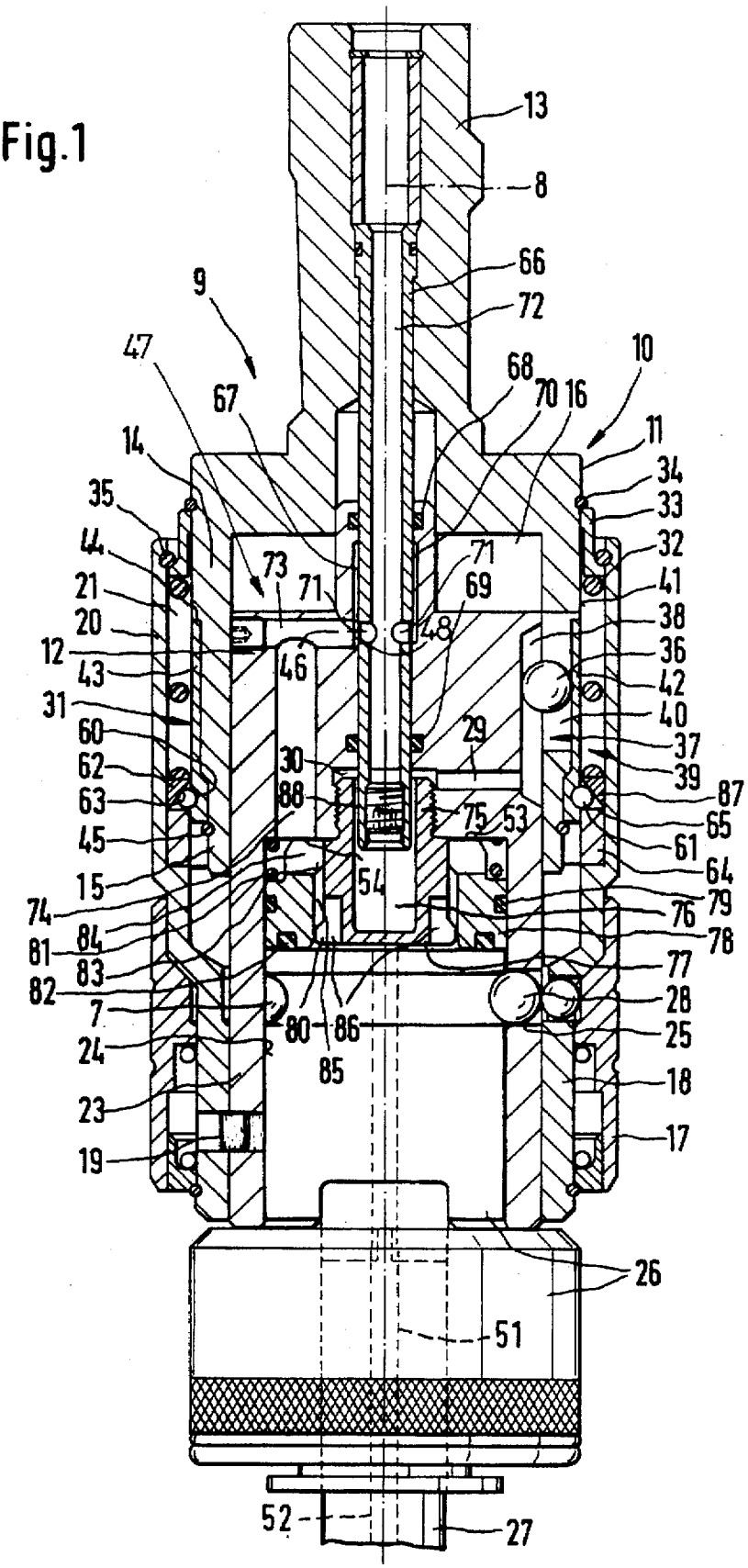
FIG. 1 is a view schematically showing an axial longitudinal section of a tool holder in accordance with the first embodiment of the present invention, with an inserted quick exchange insert in an operational position.
Figure 2:
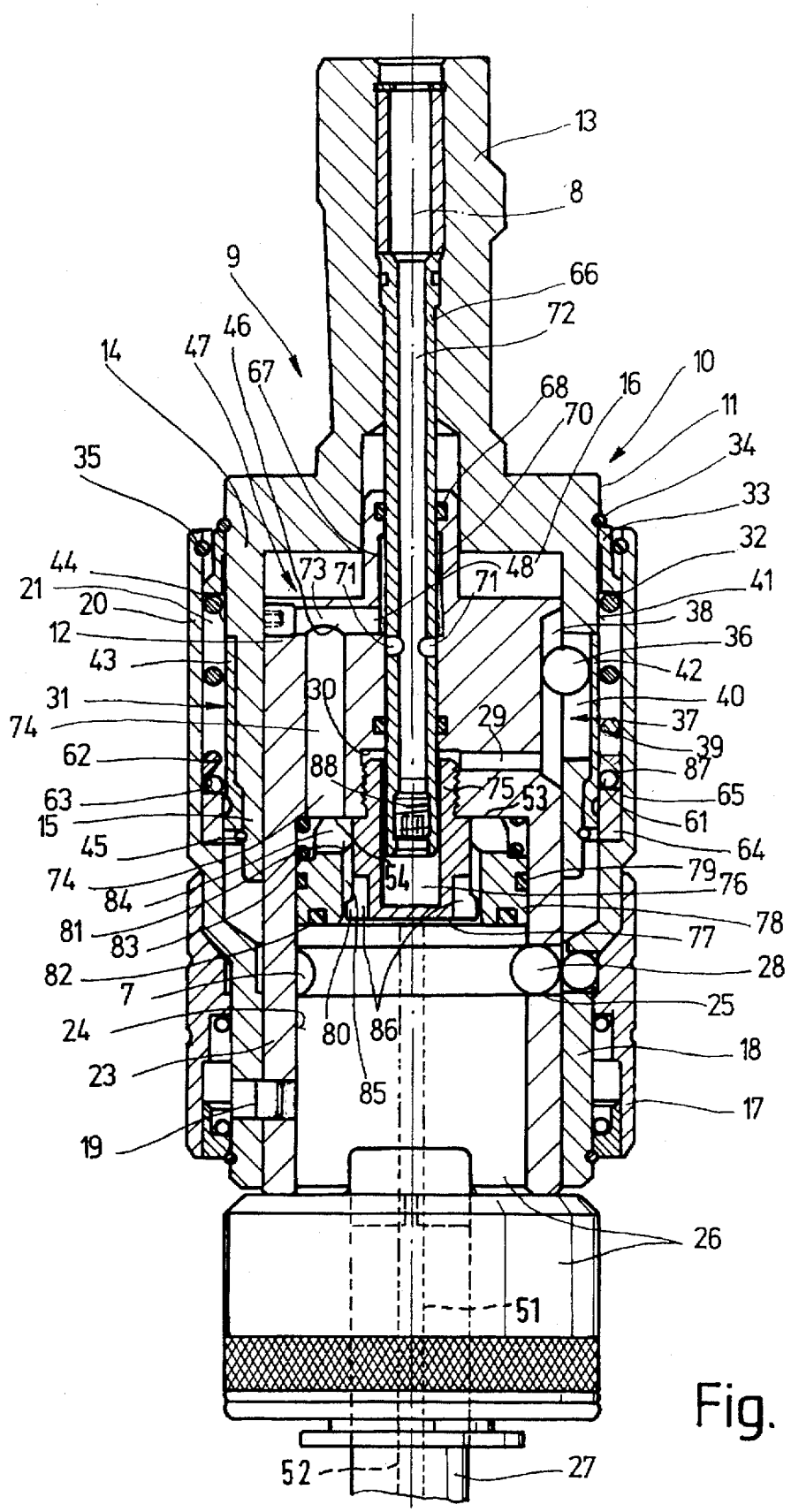
FIG. 2 is a view schematically showing an axial longitudinal section of the tool holder of FIG. 1, but in another relative axial position.

A tool holder 9 in accordance with the first embodiment shown in FIGS. 1 and 2 is composed in particular of a quick exchange chuck 10, for example for thread cutting, thread forming, drilling, etc. The quick exchange chuck 10 has a receptacle 11 and a housing 12. The receptacle 11 is formed in an upper end 13 in FIG. 1 for insertion in a not shown machine spindle, a tool receptacle and the like of a power tool. For this purpose, the end 13 is formed for example as a shaft which can be received in a not shown machine spindle, tool receptacle and the like directly or with interposition of an adjusting element, and coupled with the same for transmission of rotation.

The opposite end of the receptacle 11 which is in the lower end in FIG. 1 is provided with a head 14 with a cylindrical wall 15 and an inner coaxial cylindrical opening 16 which is open downwardly in FIG. 1. The housing 12 is inserted in the opening 16 non-rotatably, but displaceably in an axial longitudinal direction along a longitudinal central axis 8 so as to be guided in the opening.

The housing 12 has a substantially reversed cupshape. In a lower part, it has a cylindrical wall 23 which surrounds a coaxial, cylindrical and downwardly open opening 24 shown in FIG. 1. A quick exchange insert 26 is inserted in the opening 24 and coupled with the cylindrical wall in an axial and rotary transmitting manner. The quick exchange insert 26 carries a tool 27 which is used for example for thread cutting, thread forming, and the like. The axial form-locking arresting and the rotation transmission of the inserted quick exchange insert 36 is performed in a conventional manner, such as for example disclosed in German document DE-OS 39 02 559, through at least one holding bolt 28 which is held in radial opening 25 of the cylinder wall 23 of the housing 12. The holding bolt 28 form-lockingly engages in an outer ring groove 7 of the quick exchange insert 26. It is to be understood that several holding bolts 28 can be arranged over a periphery at distances from one another.

The holding bolt 28 is actuated by an outer actuating sleeve 17 which surrounds an outer sleeve 18 and is displaceable relative to it in an axial direction. The outer sleeve 18 engages the cylinder wall 23. It is fixedly arranged on it and fixedly connected with it by means for example of a threaded screw 19. The inner diameter of the outer sleeve 18 extends upwardly in FIG. 1, so that it surrounds with an upper cylindrical neck 20 the cylinder opening 15 of the head 14 so as to form a ring chamber 21. An axial length compensating device 31 is arranged in the ring chamber 21. It is acting axially between the housing 12 and the receptacle 11 and provide an axial length compensation during a relative displacement in both axial directions, or in other words, during pulling and pushing. At the same time, the length compensating device 31 operates as a cutting pressure amplifier during pressing in an axial direction in FIG. 1 from above downwardly.

The length compensating device 31 has a single pressure spring 32 located in the ring chamber 21 for the length compensation in one or in another axial direction. The pressure spring 32 is supported at the upper end against a ring 33 which is secured by a spring ring 34 upwardly on the receptacle 11 from displacement. Due to a spring ring 35 on the inner side of the neck 20, during relative displacement of the housing 12 downwardly in FIG. 1, the ring 33 can also displace downwardly. During a relative displacement of the housing 12 with the outer sleeve 18 in FIG. 1 upwardly, the ring 23 remains as an abutment for the pressure spring 32. This is the case when for example during drilling an axial pressure from the machine spindle acts through the receptacle 11 onto the tool 27, and after a reaction of the cutting pressure amplifier, is taken by the pressure spring 32 since the receptacle 11 with the ring 33 moves downwardly relative to the housing 12 in FIG. 1 with compression of the pressure spring 32.

The head 14 is coupled with the housing 12 in an axial direction and a circumferential direction through at least one driver body 36. The driver body is formed for example as a driver ball located between the head and the housing 12. The at least one driver body 36 is held partially in an associated longitudinal groove 37 of the head 14 and partially in an associated longitudinal groove 38 of the housing 12. Therefore, the torque can be transmitted and the driver body 36 during the relative displacement within the head 14 and the housing 12 can roll, so that an easy relative displacement is provided.

The at least one driver body 36 is arranged guidance-free between the head 14 and the housing 12 with respect to its position in a longitudinal direction, or in other words in a direction substantially parallel to the longitudinal central axis 8. It is loaded with an arresting tensioning member 39 from outside inwardly, with a pressing force. This holds the driver body 36 in the above mentioned position, or in other words prevents that the driver body 36 falls down into the longitudinal grooves 37, 38 in FIG. 1 and then during the relative displacement between the head 14 and the housing 12 is no longer capable of rolling.

As can be seen from FIG. 1, the longitudinal groove 37 in the head 14 provided for each driver body 36 is formed in a cross-section as a throughgoing longitudinal slot 40 in the cylindrical wall 15 of the head 14. The driver body 36 engages in the transverse direction through the associated longitudinal slot 40 through the head 14 and insignificantly projects outwardly beyond the outer side 41 of the head 40 in the region of the longitudinal slot 40. The elastic tensioning member 39 in an especially advantageous manner is formed as a circumferential tensioning member 42. It at least partially surrounds the head 14 over its outer side 41 in the region of the driver body 36 and engages on the projecting part of the driver body 36 so as to deploy there a pressing force acting from outside inwardly. The circumferential tensioning member 42 is formed as an elastically springy ring part, for example a ring or cylinder sleeve, composed of metal. It is fixed in an axial direction of the head 14, in particular on its outer side 41. A ring receptacle 43 with an upper axial shoulder 44 is arranged on the outer side 41, and the circumferential tensioning member 42 is fixed in an axial direction in FIG. 1 axially upwardly. The fixation on the opposite side which in FIG. 1 is downwardly, is performed by a spring ring 45 on the cylinder wall 15 of the head 14.

The circumferential tensioning member 42 can be formed as a closed ring part or can be interrupted in an axial longitudinal direction at a location, for example, slotted.

The above mentioned length compensating device 31 is located on the outer side of the circumferential tensioning member 42. It has at the lower end in FIG. 1 on its outer side a ring groove 60, and several balls 61 are supported inside the ring groove 60 with a peripheral part. A supporting ring 62 surrounds the circumferential tensioning member 42 in the ring chamber 21. It has at one side an inclined surface 63 and is pressed by a pressure spring 32 with its inclined surface 63 in an axial longitudinal direction, or in other words downwardly in FIG. 1 against a projecting circumferential part of the balls 61. A substantially cylindrical sleeve-shaped ball holder 64 is arranged in the ring chamber 21 between the head 14 and the outer side of the circumferential tensioning member 42. The ball holder 64 abuts in an axial direction downwardly in FIG. 1 against the axial sleeve 18 and in particular on an axial ring shoulder which is formed in the circumferential region toward the neck 20. The upper region of the ball holder 64 in FIG. 1 has radially oriented openings 65 formed for example as holes for holding the balls 61. The end region which is provided with the openings 65 is inclined so that it narrows upwardly in FIG. 1. Its inclination angle corresponds to the inclination angle of the inclined surface 63 of the supporting ring 62 at least substantially. The supporting ring 62 is arranged on the inclined, facing end 87 of the ball holder 64 so that the supporting ring 62 is in contact by its inclined surface 63 with at least insignificantly projecting the balls 61 on the end 87.

When an axially directed pressing force acts from the machine spindle, to a receptacle and the like and from the receptacle 11 with the axially stepped tool 27, the balls 61 are loaded by the flank of the ring groove 60 of the circumferential tensioning member 62. The stronger the force, the greater is the sloping of the balls 61. When a counterforce provided by the pressure spring 32 and the incline of the inclined surface 63 of the supporting ring 32 is exceeded, the balls 61 move outwardly with displacement of the supporting ring 62 against the action of the pressure spring 32. Thereby a desired, adjustable pressure is provided for the cutting start, for example of a thread drill. The pressure spring 32 can provide a length compensation on pressure during the relative displacement between the head 14 and the housing 12.

When to the contrary, with the axially fixed tool 27 and housing 12, the receptacle 11 with the head 14 is pulled axially upwardly in FIG. 1, it moves the balls 61 located in the ring groove 60 and through the balls 61 also the ball holder 64 together with supporting ring 62 abutting against the balls 61, with the head 14 upwardly. Thereby the pressure spring 32 is loaded with pressure and a length compensation between the head 14 and the housing 12 is possible in the pulling direction.

The tool holder 9 is further provided with an inner cooling medium guide. It is formed in an especially simple manner when the length compensating device 31 is supported outwardly and in the outer peripheral region of the cylinder wall 15. The quick exchange chuck 10 has a central inner pipe 66 which supplies the cooling medium and is mounted with an upper end on the receptacle 11. From there it extends in the coaxial cylinder opening 16 and the central opening 67 of the housing 12. The opening 67 forms a ring chamber 70 for the cooling medium, which is sealed at both axial ends by sealing rings 68 and 69. It is limited inwardly by the pipe 66 and outwardly by the opening 67. The ring chamber 70 communicates through at least one passage 71 in the pipe 66, for example an opening in the pipe wall, with an interior 72 of the pipe 66. On the other hand, the ring chamber 70 is connected with channels 73, 74 in the housing 12. The channel 73 extends for example radially while the channel 74 extends for example substantially axis-parallel, and both channels 73, 74 extend substantially outside of the center of the housing 12. The channels 74 lead to the coaxial cylindrical opening 24 of the housing 12.

The free end of the pipe 66 located below in FIG. 1 is closed for example by a plug. It extends through a central axial opening 75 through the housing 12 having a diameter which is greater than for example the thread opening. The end of the pipe 66 extends there in a chamber 76 formed in the interior of a substantially cup-shaped closing member 77 and is closed downwardly. The closing member 77 is screwed with a pin in the opening 77 and therefore mounted on the housing 12.

The closing member 77 is surrounded by spring ring 78. The spring ring is held axially displaceably in the cylindrical opening 24 of the housing 12 and also if needed, rotatably in a circumferential direction relative to the housing 12, in particular its cylinder wall 23. It can be sealed from the cylinder 23 by a sealing ring 79.

The closing member 77 is provided on an axial end with at least one radial outer projection 80, formed in particular as a ring shoulder. The projection 80 operates as an abutment for the blocking ring 78 with the removed fast exchange insert 26. The blocking ring 78 has on one end at least one radially inwardly projecting stop 81, for example a stop shoulder. When the fast exchange insert 26 is removed, and the blocking ring 71 is free in an axial direction, an end seal 82 which can also act as a coupling member and for example friction member seals opposite to the facing end side of the fast exchange insert. Therefore, the blocking ring 78 is displaced downwardly by the force of a spring 83 which loads it in a circumferential direction and/or an axial direction, until the abutment 81 in particular the abutment shoulder, abuts against the projection 80 in particular the ring shoulder, of the closing member 77 and thereby a pressing-out of the blocking ring 78 is prevented. When the fast exchange insert 26 is inserted again, then the blocking ring 78 is displaced against the action of the spring 83 to the position shown in FIG. 2. The spring 83 can be fixed with one end on the blocking spring 78 and with another end on the housing 12.

The cooling medium arriving to the passage 74 is supplied through the passages of the closing member 77 and the blocking ring 78 downwardly, so that it can flow through a central opening 51 in the quick exchange insert 26 and for example through an opening 52 into the tool 27. For this purpose a blocking ring 78 is provided on the upper end with at least one transverse passage 84, for example a transverse groove which communicates with the passage 74. The transverse passage 84 communicates with a ring chamber 84 formed peripherally between the closing member 74 and the blocking ring 78.

A closing member 77 has a free lower end and is provided in the region of this end at its outer side with at least one recess 86 or two diametrically opposite recesses. The recess 86 communicates with the ring chamber 85 for supplying the cooling medium.

The cooling medium is introduced for example into the interior of the end 13 of the receptacle 11 and flows into the interior 72 of the pipe 66, and then is supplied through at least one passage 71 into the ring chamber 70 and from there through the passages 73, 47 to the at least one transverse passage 84 on the inner end of the blocking ring 78. Then the cooling medium flows from the transverse passage 84 through the ring chamber 85 and the recess 86, where it exits and enters the inner central opening 51 of the quick exchange insert 26.

The closing member 77 and the blocking ring 78 can be formed so that when the quick exchange insert 26 is removed and when the blocking ring 78 is displaced downwardly, the cooling medium flow from the ring chamber 85 outwardly is locked. Therefore, when the quick exchange insert 26 is removed no cooling medium can flow out.

The above described cooling medium supply by means of the pipe 66 mounted in the receptacle 11 is especially simple and inexpensive. Since during a relative displacement between the housing 12 and the head 14 the pressure column of the cooling medium under pressure is not moved, any falsification of the relative position between the head 14 and the housing 12 is excluded. Furthermore, a pressure unloading is obtained.

The chamber 76 formed in the interior of the closing member 77, in which the free end of the pipe 66 is inserted and introduced more or less deep during the relative movement between the head 14 and the housing 12, is ventilated outwardly. It is thereby prevented that a pressure can be built which can undesirably affect the relative movement. A ventilation passage 29 is provided for ventilation of the housing 12. The ventilation passage is formed here for example as at least one radial passage which extends outwardly to a longitudinal groove 38 and therefore is ventilated through the longitudinal groove 38, the longitudinal groove 37 and the ring chamber 21. The ventilation passage 29 communicates in the inner region of the housing 12 with a central chamber 30, which communicates in turn with the chamber 76 in the closing member 77. In a not shown embodiment it is possible to achieve this for example by one or several openings in the pipe 66, in particular in the pipe wall. In the shown example, a ring chamber 88 remains between the closing member 77 and the free end of the pipe 66 extending in it. The ring chamber 88 establishes the communication between the chamber 76 and the central chamber 30 and the ventilation passage 29 so that the chamber 76 is ventilated in an especially simple manner.

As can be seen the tool holder 9 has therefore a central inner cooling medium guide from the head 14 through the housing 12 to the quick exchange insert 26 and in the latter. A further important feature of the tool holder 9 is that it is provided with an inner signal device 47 which reacts to a relative movement between the head 14 and the housing 12 to provide a disturbance signal when the tool 27 is damaged or destroyed. The signal device 47 is integrated in the tool holder and formed so that it reacts to an axial displacement of the head 14 relative to and in direction toward the housing 12. The inner signal device 47 has a blocking device 46 acting on the cooling medium flow and/or cooling medium pressure. During a relative movement, in particular an axial relative displacement, between the head 14 and the housing 12, it blocks the cooling medium flow. Thereby an increased ram pressure of the cooling medium is produced in the region of the supply of the cooling medium, in other words, preferably outside of the tool holder 9 to be determined and evaluated as a disturbance signal. A part of the blocking device 46 is formed by the pipe 66 which controls through an outlet 71 provided in the pipe wall and communicating with the interior 72, the supply of the cooling medium to an inlet 48 of the passages 73, 74 in the housing 12. The inlet 48 of the passages 73, 74 in the housing 12 is closeable by the pipe 66 during an axial displacement of the receptacle 11 with the head 14 and with the pipe 66 mounted on it relative to and in direction toward the housing 12 as shown in FIG. 2.

In this position of the inlet 48 closed by the wall of the pipe 66 the cooling medium supplied to the housing 12, in particular into the passages 73 and 74 is blocked. An increased ram pressure is produced in the interior 72 of the pipe 66, which ram pressure is a disturbance signal that the tool 27 is damaged or completely destroyed. This happens when for example during the thread drilling the thread drill as the tool 27 is eroded or broken or a drilling tool as the tool 27 becomes dull during machining and no longer cuts. Then the workpiece prevents rotation of the tool 27 and thereby the quick exchange insert 26 relative to the head 14. A safety coupling provided in the quick exchange insert 26 reacts and activates a separation of the rotary drive. However, the feed acting in the axial direction in FIG. 1 from above downwardly from the machine is further operative, and thereby the receptacle 11 with the head 14 and the pipe 16 is displaced axially relative to and in direction toward the housing 12. During this displacement the outlet 71 of the pipe 66 in FIGS. 1 and 2 moved downwardly and from the region of the inlet 48 which is closed from the outer surface by the pipe 26. The higher ramp pressure produced thereby in the region of the cooling medium supply can be determined, for example, by measuring devices provided in the machine and a signal can be produced which represents a disturbance. Thereby a defective tool 27 can be automatically detected, so that because of the corresponding signal, an exchange of the tool 27 can be performed before the start of the next operation step. Since the closing and blocking of the cooling medium flow is performed not floating but relatively strike-like, there is a strike-like pressure change of the cooling medium. This improves the formation of exact measuring values and facilitates a precise determination of a ram pressure increase.

In another, not shown embodiment the signal device 47 is designed so that it reacts to an axial relative displacement of the head 14 relative to the housing 12 and thereby in direction from the housing, in other words upwardly in FIGS. 1 and 2. The blocking device 46 is designed in this case as described hereinabove. The only difference is that during the relative displacement upwardly in FIGS. 1 and 2, the outlet 71 of the pipe 66 is closed from the neck part of the housing 12 surrounding the pipe 66, and thereby the cooling medium flow from the outlet 71 to the inlet 48 and to the passage 73 is blocked.

It is to be understood that the signal device 47 is operative in connection with the different types of the cooling medium, in particular both for liquid cooling medium and gaseous cooling medium, such as air and the like.

Figure 3:
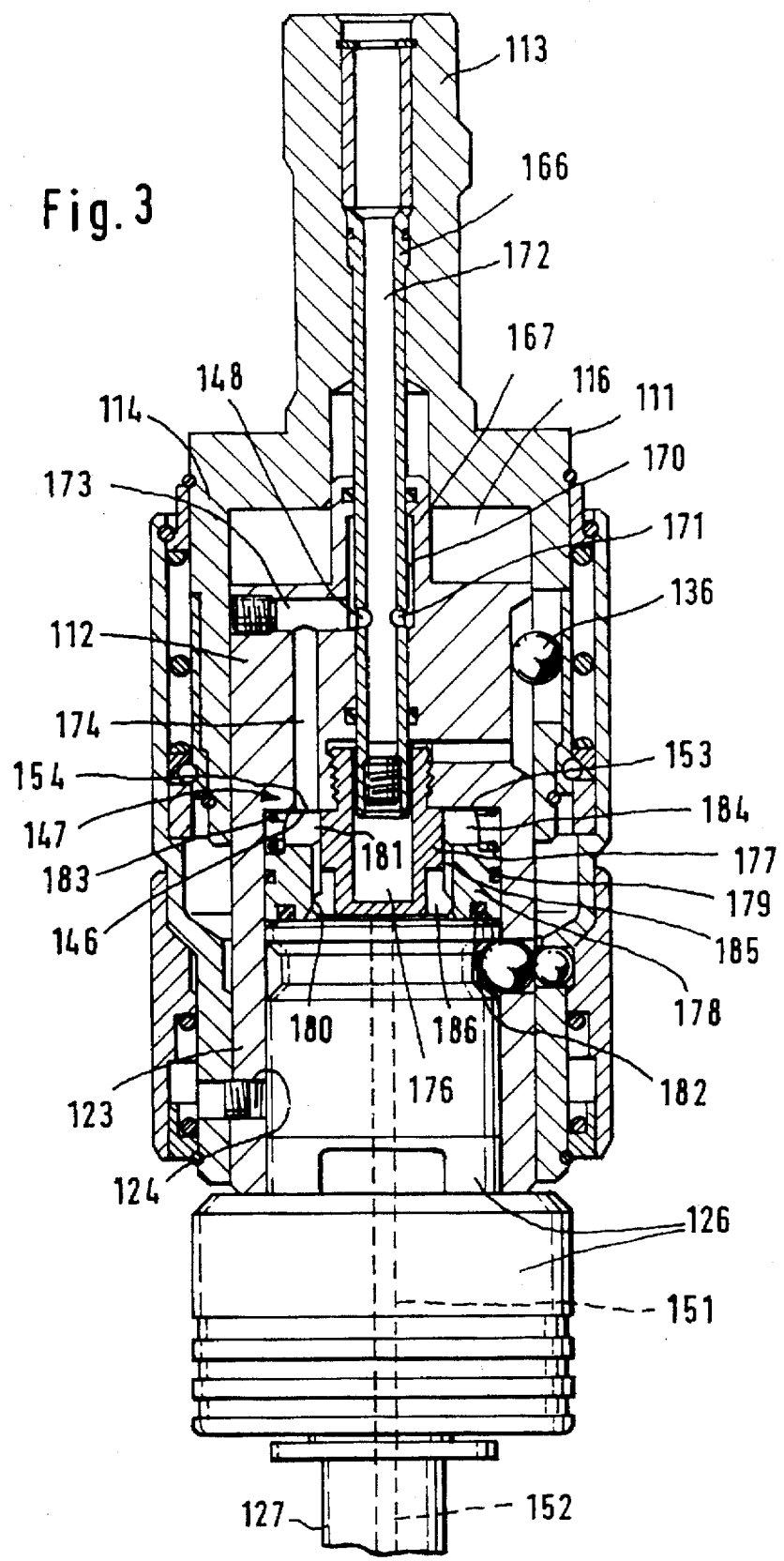
FIG. 3 is a view schematically showing an axial longitudinal section of the tool holder in accordance with the second embodiment of the present invention, with an inserted quick exchange insert in an operational position.
Figure 4:
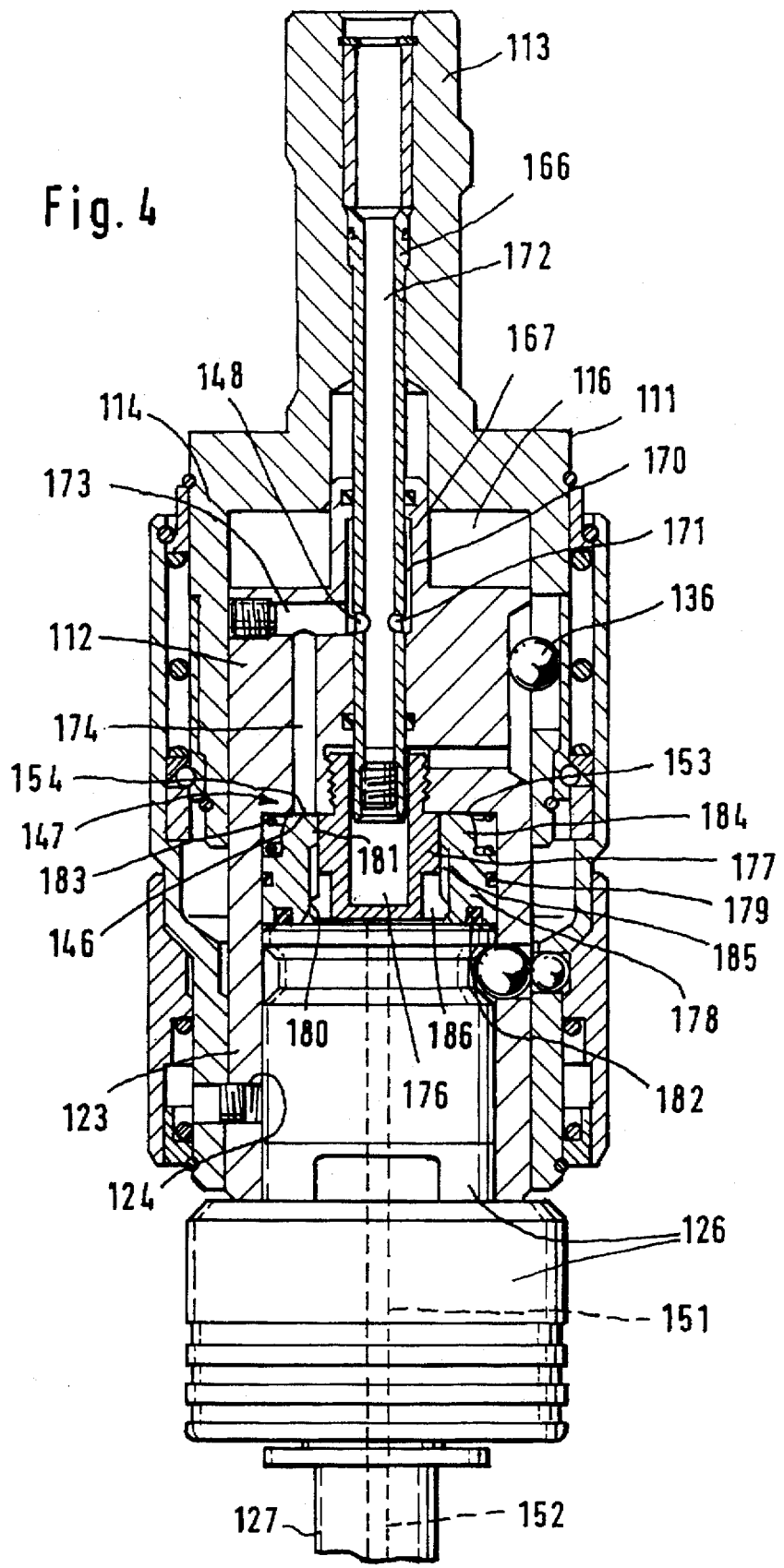
FIG. 4 is a view schematically showing an axial longitudinal section of the tool holder of FIG. 3, however in another relative rotary position.

The second embodiment of the tool holder shown in FIGS. 3 and 4 has parts which correspond to the parts of the first embodiment and these parts are identified with reference numerals which are by 100 greater than the reference numerals in FIGS. 1 and 2.

As can be seen from FIGS. 3 and 4, the tool holder shown in these Figures substantially corresponds to the tool holder of the first embodiment. This is true for the blocking ring 178 provided on the upper end with an end-side plain surface 153 with at least one transverse passage 194 extending through it for example in radial direction. The transverse passage 184 can extend diametrically and has a relatively small transverse size. The transverse passage 184 communicates with the recess 186 of the closing member 177 and serves for cooling medium supply in the relative rotary position of the blocking ring 178 relative to the housing 112 shown in FIG. 3. The cooling medium flowing through the interior 172 of the pipe 166 can exit through the passages 171 and enter in the inlet 148, and from there exits through the passages 173 and 174 out of the opening 154 and flow through the transverse passage 184 of the blocking ring 178 and for example through the ring chamber 188, to the recess 186 in the blocking member 177. From there it flows into the opening 151 of the quick exchange insert 126, and then through the opening 152 of the tool holder 127 to the not shown end of the tool to a discharge from it. Since the blocking ring 177 is under the pressure of the cooling medium and is pressed by the force of the spring 183 in FIG. 3 downwardly and with the seal 182 against the end surface of the quick exchange insert, the cooling medium cannot discharge outwardly in this region. The circumferential sealing ring 179 also provides a sealing against discharge of the cooling medium.

In the tool holder shown in FIGS. 3 and 4, the inner signal device 147 reacts to a relative rotation between the housing 112 and the blocking ring 178. The blocking device 146 blocks the cooling medium flowing in the rotary direction during a relative rotation between the housing 112 and the blocking ring 178. This blocking position shown in FIG. 4 is obtained when for example the tool 127 is damaged and the drive of the tool 127 and the quick exchange insert 126 in the circumferential direction produced through the receptacle 111 is stopped. The pressure of the cooling medium acting on the blocking ring 178 also acts so that the blocking ring 178 is pressed with the seal 182 against the facing end side of the quick exchange insert 126. The seal 188 operates as a coupling medium, for example friction medium, which with the acting high cooling medium pressure and the fixed pressing of the blocking ring 178 against the quick exchange insert 126 during stopping of the latter, provides a coupling of the blocking ring 178 with the quick exchange insert 126.

If thereby the quick exchange insert 126 is stopped for the above mentioned reasons, the blocking ring 178 is also stopped through the coupling means 182 while the receptacle 111 together with the housing 112 rotates further in the circumferential direction at least over a small circumferential angle. This results in a relative rotation between the standing blocking ring 178 on the one hand and the rotatable housing 112 on the other hand. The opening 154 of the passage 174 moves from the region of the transverse passage 184 in the blocking ring 178 outwardly and blocks the opening 154 in a region neighboring in a circumferential direction on the end plain surface 153 of the blocking ring 178. Thereby the cooling medium supplied to the passage 174 is prevented to flow through the transverse passage 184, the ring chamber 185, the recess 186 to the opening 151. The cooling medium throughflow is thereby blocked, and the thusly produced ram pressure of the cooling medium in the region of the supply of the cooling medium, for example outside of the tool holder, is detected as a disturbance signal and evaluated.

In the second embodiment the blocking device 146 has the end plain surface 153 of the blocking ring 178 on the one hand and the opening 154 on the end of the passage 174 which is closeable by the blocking ring on the other hand. The blocking ring 178 can be brought to the position of the throughflow shown in FIG. 3 after blocking of the cooling medium flow of FIG. 4, by opposite-direction rotation.

In the second embodiment shown in FIGS. 3 and 4, the blocking ring 178 is held in the opening 124 of the housing 112 rotatably relative to the latter. The blocking ring 178 is turnable back by the spring force to its releasing position. The spring force can be applied by the spring 183 which axially loads the blocking ring 178 and the opening 122 of the housing 112. Instead, an additional spring can act on the blocking ring 178 in the circumferential direction. A spring 183 can be fixed with one end on the blocking ring 177 and with the other end on the housing 112 in the circumferential direction, and additionally for axial spring force can produce a spring force acting in the circumferential direction. The spring force which acts for turning the blocking ring 178 to the position shown in FIG. 3 must not be unconditionally high. When the blocking position is obtained in FIG. 4 and thereby a disturbance signal is produced, the machine is turned off and brought back to its initial position. The quick exchange insert 126 is removed. The blocking ring 138 is thereby free so that the spring 183 is in the position to turn back the blocking ring 178 to the position shown in FIG. 3. In the cases when the spring 183 must not activate the return of the blocking ring 178, the blocking ring 178 can be turned back by an opposite turning of the tool holder to the initial position shown in FIG. 3 in which the cooling medium throughflow is possible.

It will be understood that each of the elements described above, or two or more together, may also find a useful application in other types of constructions differing from the types described above.

While the invention has been illustrated and described as embodied in a tool holder, in particular quick exchange chuck, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A tool holder, comprising a receptacle having one end connectable with a machine spindle, a tool receptacle and the like and an opposite end; a head provided on said opposite end and having a coaxial cylindrical head opening; a housing received non-rotatably and axially longitudinally displaceable in said head opening and having a coaxial cylindrical housing opening; a quick exchange insert provided for a tool and insertable in said housing opening and coupleable with said housing; an inner signal device reacting to a relative movement between said head and said inserted quick exchange insert to produce a disturbance signal which identifies a damaged or destroyed tool; and means for a central inner cooling medium supply from said head through said housing to said quick exchange insert, said inner signal device having a blocking device which acts on a parameter of the cooling medium selected from the group consisting of cooling medium flow and a cooling medium pressure.

2. A tool holder as defined in claim 1; and further comprising a driver body arranged between said head and said housing and rolling during a relative displacement between said head and said housing for torque transmission between said head and said housing.

3. A tool holder as defined in claim 1, wherein said blocking device is formed so that during the relative movement between said head and said quick exchange insert it blocks the cooling medium flow so as to produce an increased ram pressure of the cooling medium which ram pressure serves as the disturbance signal.

4. A tool holder as defined in claim 1, wherein said cooling medium supply means includes a pipe having one end mounted in said receptacle and extending in said head and a central opening of said housing, a passage formed in said housing and having an inlet controlled by said pipe, said having a tubular wall provided with an outlet so that cooling medium flows through said outlet into said inlet of said passage in said housing.

5. A tool holder as defined in claim 4, wherein said inlet of said passage is formed by a ring chamber of said housing, said ring chamber having sealed axial ends and being inwardly limited by said pipe.

6. A tool holder as defined in claim 4, wherein said outlet of said pipe is formed by at least one radial opening which communicates with an interior of said pipe and also communicates with said inlet of said housing.

7. A tool holder as defined in claim 4, wherein said inlet is connected with said passage in said housing which extends to said housing opening.

8. A tool holder as defined in claim 7, wherein said passage is located outside of a center of said housing.

9. A tool holder as defined in claim 1, wherein said housing is formed as a closing member, said cooling medium supply means including a pipe having an end extending in an interior of said closing member.

10. A tool holder as defined in claim 1; and further comprising a closing member provided in said housing and having an interior which is closed to an interior of said housing opening.

11. A tool holder as defined in claim 1; and further comprising a closing member provided in said housing and having an interior which is ventilated.

12. A tool holder as defined in claim 1; and further comprising a closing member provided in said housing and having at least one radially extending projection on an axial end of said closing member.

13. A tool holder as defined in claim 1; and further comprising a closing member provided in said housing and having at least one radially extending ring shoulder on an axial end of said closing member.

14. A tool holder as defined in claim 1; and further comprising a closing member provided in said housing and having a free end with a recess, said recess being open to a circumferential side and to said free end of said closing member for passing of the cooling medium.

15. A tool holder as defined in claim 1; and further comprising a blocking ring held in said housing opening.

16. A tool holder as defined in claim 15, wherein said housing has a cylindrical wall; and further comprising a sealing ring which seals said blocking ring in said circumferential direction relative to said cylindrical wall.

17. A tool holder as defined in claim 16, wherein said blocking ring surrounds said closing member so as to form a circumferential ring chamber therebetween.

18. A tool holder as defined in claim 15; and further comprising a closing member provided in said housing and having a projection, said blocking ring having an end provided with a radially inwardly extending stop abutting said projection of said closing member when said quick exchange insert is removed.

19. A tool holder as defined in claim 15; and further comprising a closing member provided for said housing and having a recess, said blocking ring having an end provided with a transverse passage which communicates with said recess of said closing member through a ring chamber between said blocking ring and said closing member for cooling medium supply.

20. A tool holder as defined in claim 15; and further comprising a spring which applies force to said blocking ring so that it is displaceable in said housing opening.

21. A tool holder as defined in claim 15, wherein said blocking ring has an end side provided with a seal pressing against an associated end side of said quick exchange insert.

22. A tool holder as defined in claim 21, wherein said seal is pressed against said end side of said quick exchange mechanism under the action of a pressure of the cooling medium.

23. A tool holder as defined in claim 21; and further comprising a spring which presses said seal of said blocking ring against said end side of said quick exchange insert.

24. A tool holder as defined in claim 1, wherein said signal device is formed so that it reacts to an axial displacement of said head relative to and in direction toward said housing.

25. A tool holder as defined in claim 1, wherein said signal device is formed so that it reacts to an axial displacement of said housing relative to and toward said head.

26. A tool holder as defined in claim 1, wherein said signal device includes a blocking device which blocks an axial relative displacement of the head relative to said housing so as to produce an increased ram pressure of the cooling medium and therefore form a disturbance signal.

27. A tool holder as defined in claim 4, wherein said inlet of said passage in said housing during an axial displacement of said head with said pipe relative to said housing is closed and thereby a flow of the cooling medium is blocked.

28. A tool holder as defined in claim 1, wherein said inner signal device is formed so that it reacts to a relative rotation between said housing and said blocking ring.

29. A tool holder as defined in claim 28, wherein said signal device includes a blocking device which blocks a flow of the cooling medium during a relative rotation between said housing and said blocking ring in one rotary direction and therefore produces an increased ram pressure of the cooling medium which serves as a disturbance signal.

30. A tool holder as defined in claim 28, wherein said blocking ring has an end provided with a plain surface which blocks an opening of a passage in said housing depending on a relative rotary position of said blocking ring relative to said housing for blocking a flow of the cooling medium or releases the opening of said passage in said housing during a rotation of said blocking ring relative to said housing in an opposite direction.

31. A tool holder as defined in claim 30, wherein said blocking ring is held rotatable relative to the housing in said housing opening.

32. A tool holder as defined in claim 31, wherein said blocking ring is turnable in an opposite direction to a release position under the action of a spring force.

33. A tool holder as defined in claim 32; and further comprising a spring providing the spring force to force said blocking in said housing opening.

34. A tool holder as defined in claim 33, wherein said spring has one end fixed to said blocking ring and another end fixed to said housing in a circumferential direction, and in addition to an axial spring force produces a spring force acting in a circumferential direction.

35. A tool holder as defined in claim 28; and further comprising a coupling means which transfers a relative rotation of said quick exchange insert relative to said housing to said blocking ring.

36. A tool holder as defined in claim 35, wherein said coupling means is formed so as to act as an end-side seal of said blocking ring.

37. A tool holder, comprising a receptacle having one end connectable with a machine spindle, a tool receptacle and the like and an opposite end; a head provided on said opposite end and having a coaxial cylindrical head opening; a housing received non-rotatably and axially longitudinally displaceable in said head opening and having a coaxial cylindrical housing opening; a quick exchange insert provided for a tool and insertable in said housing opening and coupleable with said housing; an inner signal device reacting to a relative movement between said head and said inserted quick exchange insert to produce a disturbance signal which identifies a damaged or destroyed tool, said signal device including a blocking device which reacts to an axial relative displacement of the head relative to said housing so as to block the cooling medium flow and therefore producing an increased ram pressure of the cooling medium and by this forming a disturbance signal.

38. A tool holder, comprising a receptacle having one end connectable with a machine spindle, a tool receptacle and the like and an opposite end; a head provided on said opposite end and having a coaxial cylindrical head opening; a housing received non-rotatably and axially longitudinally displaceable in said head opening and having a coaxial cylindrical housing opening; a quick exchange insert provided for a tool and insertable in said housing opening and coupleable with said housing; an inner signal device reacting to a relative movement between said head and said inserted quick exchange insert to produce a disturbance signal which identifies a damaged or destroyed tool, said inner signal device being formed so that it reacts to a relative rotation between said housing and said blocking ring, said signal device including a blocking device which blocks a flow of the cooling medium during a relative rotation between said housing and said blocking ring in one rotary direction and therefore produces an increased ram pressure of the cooling medium which serves as a disturbance signal.

39. A tool holder as defined in claim 38, wherein said blocking ring has an end provided with a plain surface which blocks an opening of a passage in said housing depending on a relative rotary position of said blocking ring relative to said housing for blocking a flow of the cooling medium or releases the opening of said passage in said housing during a rotation of said blocking ring relative to said housing in an opposite direction.

40. A tool holder as defined in claim 39, wherein said blocking ring is held rotatable relative to the housing in said housing opening.

41. A tool holder as defined in claim 40, wherein said blocking ring is turnable in an opposite direction to a release position under the action of a spring force.

42. A tool holder as defined in claim 41; and further comprising a spring providing the spring force to force said blocking ring in said housing opening.

43. A tool holder as defined in claim 42, wherein said spring has one end fixed to said blocking ring and another end fixed to said housing in a circumferential direction, and in addition to an axial spring force produces a spring force acting in a circumferential direction.

44. A tool holder as defined in claim 38; and further comprising a coupling means which transfers a relative rotation of said quick exchange insert relative to said housing to said blocking ring.

45. A tool holder as defined in claim 44, wherein said coupling means is formed so as to act as an end-side seal of said blocking ring.

* * * * *